(12) United States Patent
Monmeyran et al.

(10) Patent No.: US 12,270,969 B2
(45) Date of Patent: Apr. 8, 2025

(54) SUBSTRATE PROVIDED WITH A STACK HAVING THERMAL PROPERTIES AND AN ABSORBENT LAYER

(71) Applicant: SAINT-GOBAIN GLASS FRANCE, Courbevoie (FR)

(72) Inventors: Corentin Monmeyran, Le Raincy (FR); Estelle Martin, Saint-Denis (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 632 days.

(21) Appl. No.: 17/420,282

(22) PCT Filed: Jan. 14, 2020

(86) PCT No.: PCT/FR2020/050039
§ 371 (c)(1),
(2) Date: Jul. 1, 2021

(87) PCT Pub. No.: WO2020/148498
PCT Pub. Date: Jul. 23, 2020

(65) Prior Publication Data
US 2022/0091302 A1 Mar. 24, 2022

(30) Foreign Application Priority Data
Jan. 14, 2019 (FR) .................................. 1900314

(51) Int. Cl.
*G02B 1/10* (2015.01)
*G02B 5/22* (2006.01)

(52) U.S. Cl.
CPC ............... *G02B 1/10* (2013.01); *G02B 5/226* (2013.01)

(58) Field of Classification Search
CPC .......... G02B 1/10; G02B 5/226; G02B 5/282; G02B 5/0875
(Continued)

(56) References Cited

U.S. PATENT DOCUMENTS

2009/0195865 A1* 8/2009 Kleideiter ........... C03C 17/3652
359/359
2011/0236715 A1 9/2011 Polcyn et al.
(Continued)

FOREIGN PATENT DOCUMENTS

EP 0 844 219 A1 5/1998
EP 0 847 965 A1 6/1998
(Continued)

OTHER PUBLICATIONS

RP Photonics Encyclopedia "Optical Thickness" https://www.rp-photonics.com/optical_thickness.html (Year: 2018).*
(Continued)

*Primary Examiner* — George G. King
(74) *Attorney, Agent, or Firm* — Pillsbury Winthrop Shaw Pittman LLP

(57) ABSTRACT

A substrate which is coated on one of its faces with a stack of thin layers having reflection properties in the infrared and/or in solar radiation, including two metallic functional layers, in particular based on silver. Each of the metallic functional layers is disposed between two dielectric coatings. The dielectric coating Di2 situated between the two functional layers includes at least one absorbent layer which absorbs solar radiation in the visible part of the spectrum. It has been found that for a stack for laminated glazing, some symmetry at the functional metal layers and the dielectric layers 1 and 3 is favorable.

15 Claims, 2 Drawing Sheets

(58) Field of Classification Search
USPC .................................................. 359/360, 885
See application file for complete search history.

(56) References Cited

U.S. PATENT DOCUMENTS

| | | | | |
|---|---|---|---|---|
| 2012/0219821 A1* | 8/2012 | Frank | ................ | C03C 17/3639 |
| | | | | 156/60 |
| 2015/0183301 A1* | 7/2015 | Diguet | ................... | G02B 5/282 |
| | | | | 204/192.15 |
| 2019/0248700 A1* | 8/2019 | Biswas | ................ | C23C 14/083 |
| 2021/0017811 A1* | 1/2021 | Han | ....................... | B32B 17/06 |

FOREIGN PATENT DOCUMENTS

| | | |
|---|---|---|
| EP | 1 341 732 B1 | 12/2007 |
| FR | 3 019 541 A1 | 10/2015 |
| WO | WO 2014/125083 A1 | 8/2014 |
| WO | WO 2017/207278 A1 | 12/2017 |
| WO | WO 2018/075005 A1 | 4/2018 |

OTHER PUBLICATIONS

Wikipedia webpage "Optical depth" (Year: 2018).*
International Search Report as issued in International Patent Application No. PCT/FR2020/050039, dated May 28, 2020.

* cited by examiner

SUBSTRATE PROVIDED WITH A STACK HAVING THERMAL PROPERTIES AND AN ABSORBENT LAYER

CROSS-REFERENCE TO RELATED APPLICATIONS

This application is the U.S. National Stage of PCT/FR2020/050039, filed Jan. 14, 2020, which in turn claims priority to French patent application number 1900314 filed Jan. 14, 2019. The content of these applications are incorporated herein by reference in their entireties.

The invention relates to transparent substrates, in particular made of rigid mineral material such as glass (or organic such as a rigid or flexible polymer substrate), said substrates being coated with a stack of thin layers comprising at least one layer having metal-type behavior which can act on solar radiation and/or infrared radiation of long wavelength.

The invention relates more particularly to the use of such substrates for manufacturing thermal insulation glazings and/or solar protection glazings. These glazings are intended to equip as well buildings as vehicles. They aim in particular to reduce the air-conditioning work and/or to reduce excessive overheating (so-called "solar control" glazings) and/or to decrease the amount of energy dissipated outwardly (so-called "low emissivity" glazings).

A type of stack of layers which is known to confer such properties on the substrates is consisted of at least one functional metal layer having properties of reflection in the infrared range and/or in the solar radiation range, in particular a layer based on silver or on silver-containing metal alloy.

This functional metal layer is arranged between two dielectric coatings, each generally comprising several layers which are each made of a dielectric material, of metal nitride, metal oxide or metal oxynitride type. From an optical perspective, the aim of these coatings which surround the functional metal layer is "to antireflect" this functional metal layer.

This stack is generally obtained by a sequence of depositions carried out by a technique which uses vacuum, such as cathode sputtering, optionally assisted by a magnetic field.

It is also possible to provide two very thin metal layers on either side of the silver layer, the underlying layer as attachment or nucleation layer and the overlayer as protective or "sacrificial" layer in order to prevent the silver being adversely affected if the oxide layer lying over it is deposited by cathode sputtering in the presence of oxygen.

These metal layers also have the function of protecting the functional layer during a potential high-temperature heat treatment of bending and/or tempering type.

At the present time, there are low-emissivity stacks of thin layers containing a single functional layer (hereinafter referred to as "functional monolayer stack") or containing two functional layers (hereinafter referred to as "functional bilayer stack").

A stack containing two layers of silver ("bi-functional layer"), designed to be able to undergo a heat treatment of bending or tempering type without significant optical changes, by virtue of the use of oxygen barrier layers of silicon nitride type and of layers which stabilize the silver layers, is known from patent EP-0 847 965.

A stack containing two silver layers of very different thicknesses, making it possible to obtain glazings with a solar factor lowered to at least 32% is also known from patent EP-0 844 219. Double glazings using this type of stack have light transmissions of the order of 60 to 65%.

As a reminder, the solar factor (FS or "g") of a glazing is the ratio of the total solar energy entering the space through this glazing to the total incident solar energy, and the selectivity corresponds to the ratio of the light transmission $TL_{vis}$ in the visible range of the glazing to the solar factor FS of the glazing and is such that: $s=TL_{vis}/FS$.

Depending on the climates of the countries in which these glazings will be installed, particularly depending on the amount of sunshine, the desired performance properties in terms of light transmission and solar factor may vary. Consequently, different ranges of glazings characterized by their level of light transmission are developed.

For example, in countries in which the amounts of sunshine are high, there is a high demand for glazing having a light transmission ($TL_{vis}$) of the order of 30 to 50% and solar factor (FS) values which are sufficiently low (25-35%).

In particular, it may be desired to obtain glazings for which the TL is low, without the light reflection being excessively increased, while retaining the energy reflection. In particular, an RL of less than 25% (or even less than 20%) is sought.

The person skilled in the art knows that they may introduce, into the stack, and more particularly inside one (or more) dielectric coating(s), one (or more) layer(s) which absorb(s) in the visible range.

It should be noted that the use of layers which absorb in the visible range in stacks containing several functional layers is already known from the prior art, in particular patent EP 1 341 732 B1, which relates to the use of such layers which absorb in the visible range in a stack withstanding a heat treatment of bending/tempering type. The absorbent layers are of the order of 1 to 3 nm. This stack is particularly suited to double glazings and it aims to give the glazing high light transmission of the order of 50 to 65%. It could not be used for the manufacture of laminated glazings without deteriorating the optical and aesthetic properties of the glazing. In particular, it has been observed that the stack described in example 5bis gives a red tone to the glazing when the angle of incidence of the observer is 45 and 60° relative to the normal.

A stack of layers based on two layers of Ag and comprising an absorbent layer (NbZrON) in the $2^{nd}$ dielectric coating, that is between the two layers of Ag, is also known from document WO2018/075005. A low TL, of the order of 20 to 45%, is obtained. However, the color in reflection is not suitable for all markets. The colorimetric index "a*" of the La*b* system is greater than 3, which gives a red tone to the glazing (both under normal incidence and at the angle of 45° and 60°).

Obtaining a high selectivity must not be done to the detriment of the aesthetic appearance and in particular of the color. In general, it is sought to obtain as neutral an appearance as possible, that is with a* and b* close to 0, in external, internal reflection and in transmission.

The conventional approach to obtain both high selectivity and excellent color neutrality consists in developing increasingly sophisticated functional coatings.

Adapting the colorimetry of these glazings is achieved by adjusting the nature, the thicknesses of the layers or coatings forming the functional coatings.

The complexity of the functional coatings makes it difficult to obtain good thermal performance and excellent color neutrality.

This difficulty in obtaining excellent color neutrality is even more pronounced for glazings having a light transmission of the order of 25 to 75%, because they are intrinsically more colored than glazings having a higher or lower light transmission. Indeed, for very low or very high light transmissions for which the lightness is close to 0 or to 100, the perception of the colors is less intense. The colors "converge" on black and white.

Finally, the complexity of these functional coatings also makes it difficult to maintain a constant production quality for a given functional coating. Indeed, by multiplying the number of layers and materials forming these functional coatings, it is increasingly difficult to adapt the settings of the deposition conditions in order to obtain functional coatings of identical color originating from two batches produced on the same production site or of two batches produced on two different production sites.

There also is a demand for the visual appearance of the glazings to be virtually unchanged regardless of the angle of incidence at which the glazing is observed. It is therefore desirable for the color in reflection, above all on the outer side of the glazing, to be in acceptable colors, even when the observer is looking at it with an angle of incidence of 45° or 60° relative to the normal. This means that the observer is not given the impression of significant inhomogeneity of hue or appearance, in particular on tall buildings.

The aim of the invention is therefore to overcome the stated disadvantages by developing a glazing, preferably a laminated glazing, having at the same time good thermal performance, while guaranteeing the desired aesthetic appearance.

In particular, the aim of the invention is to develop a novel type of two functional layer stack, which stack has a low light transmission and a relatively neutral color in reflection.

Another important aim is to propose a two functional layer stack which has a high selectivity, while having a suitable coloring, particularly in outer reflection of the glazing, in particular which is not in the red range.

Another aim of the invention is that the color in reflection on the outer side is stable, regardless of the angle of incidence of the observer.

Thus, a subject of the invention, in its broadest interpretation, is a substrate coated on one face with a stack of thin layers forming a functional coating which can act on infrared radiation and/or solar radiation, said coating comprising two functional metal layers (F), in particular based on silver, each arranged between two dielectric coatings (Di), so as to form the sequence of layers Di1/F1/Di2/F2/Di3, said dielectric coatings (Di) each comprising at least one layer of dielectric material, said intermediate dielectric coating (Di2) comprising at least one absorbent layer (A) which absorbs solar radiation in the visible part of the spectrum, such that the at least one absorbent layer is surrounded, on one side or on both sides, by a layer of dielectric material, and the metallic functional layers (F) having a ratio of thickness of the $2^{nd}$ layer to the $1^{st}$ layer of between 0.5 and 1.5, preferably between 0.7 and 1.3, even more preferably between 0.8 and 1.2, and even more preferably still between 0.9 and 1.1;

the first and third dielectric coatings have an optical thickness ratio (Di3/Di1) of between 0.5 and 1.5, preferably between 0.7 and 1.3, even more preferably between 0.8 and 1.2, and even more preferably still between 0.85 and 1.15, or even between 0.9 and 1.1.

Figure 1:
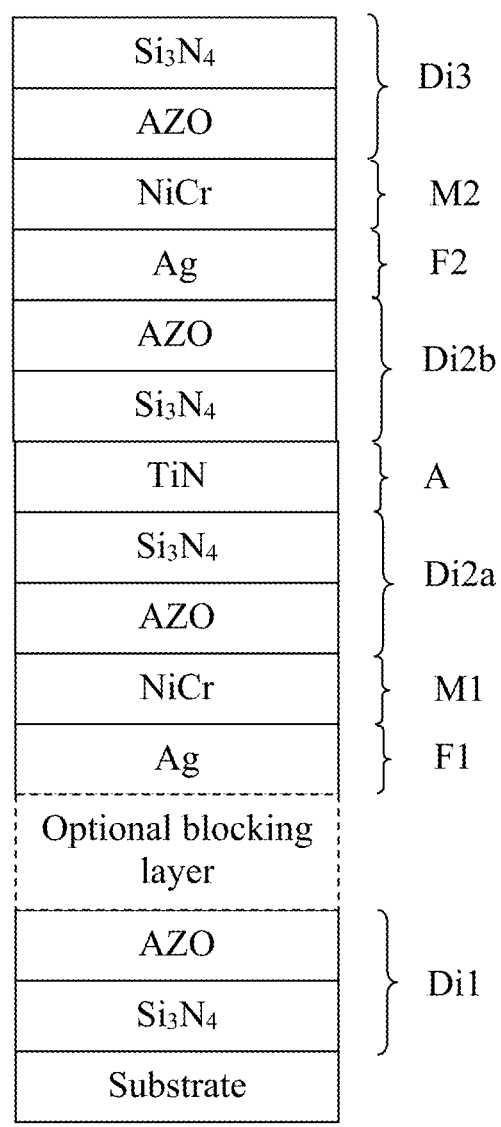
FIG. 1 schematically shows a stack according to an embodiment of the invention, and FIG. 2 schematically shows a glazing according to an embodiment of the invention.

Indeed, it has been found that it is advantageous, for a stack intended for a laminated glazing, for it to be relatively symmetrical at the functional metal layers and the dielectric layers 1 and 3. It is therefore preferred for the optical thicknesses of the functional metal layers and the dielectric coatings 1 and 3 to be similar. Indeed, it has been found that the dielectric coatings have an important role in optimizing the overall color of the stack.

"Coating" within the meaning of the present invention should be understood as meaning that there may be just one layer or several layers of different materials inside the coating.

As usual, "dielectric layer" within the meaning of the present invention should be understood as meaning that, from the perspective of its nature, the material is "nonmetallic", that is not a metal. In the context of the invention, this term denotes a material having an n/k ratio of equal to or greater than 5.

"Absorbent layer" within the meaning of the present invention should be understood as meaning that the layer is a material having and n/k ratio of between 0 and 5.

It is recalled than n denotes the actual refractive index of the material at a given wavelength and k represents the imaginary part of the refractive index at a given wavelength; the n/k ratio being calculated at a given wavelength which is identical for n and for k: in the present application, they are measured at 550 nm.

Preferably, in the stack of the coated substrate according to the invention, the at least one absorbent layer (A) is separated from each functional metal layer (F1 and F2) by at least one layer in dielectric material (Di2a, Di2b).

Advantageously, said at least one absorbent layer (A) is either of metal nature, or of nitride, oxidized, or oxynitride nature. In particular, the absorbent layer (A) is selected from layers based on one of the following materials: Ti, NiCr, Nb, Zr, NiCuCr, NbN, TiN, ZrN, NbN, TiZrN or TiNO, NbNO, or mixture thereof. This list is merely indicative since other natures of absorber may be suitable for the present invention. The nature of the absorber is selected based on the aesthetic characteristics, on the availability of the material, on the energy performance, on the durability, on the limitations of the deposition material, etc.

The thickness of the absorbent layer must be adapted, in particular based on the more or less absorbent nature of the material selected. It is therefore sensible to multiply the value of the geometric thickness by a value indicative of the absorbent nature of the material. Just as it is possible to define the optical thickness of a layer from the product of its geometric thickness by its (actual) optical index n; it is possible to define an "effective absorption thickness" using the following equation, where $t_{abs.\ effective}$ is the effective absorption thickness, $t_{geo}$ is the geometric thickness, n is the actual part of the optical index and k is the imaginary part of the optical index:

$$t_{abs.\ effective} = 2 \times t_{geo} \times n \times k$$

In particular, the effective absorption thickness (2×geometric thickness×n×k) of the absorbent layer is between 25 and 150 nm, preferably between 40 and 100 nm and even more preferably between 50 and 80 nm.

If the stack comprises several absorbent layers between the two metallic functional layers, the effective absorption thickness must be calculated by taking into account all the absorbent layers located between the two metallic functional layers. Nonetheless, the blocking layers directly in contact with the metallic functional layers, given their very small thickness, are not considered to be absorbent layers.

The absorbent layer (A) is surrounded and in contact, on one side or on both sides, with a layer of dielectric material. The layer of dielectric material is preferably selected from layers based on silicon and/or aluminum nitride. The absorbent layer (A) is preferably surrounded on both sides by layers based on silicon and/or aluminum nitride. The optical thickness of each dielectric layer, preferably based on silicon and/or aluminum nitride, surrounding the absorbent layer (A) may be:

greater than 30, greater than 40, greater than 50, greater than 60, greater than 70, greater than 80, and/or
less than 200, less than 150, less than 120.

The functional metal layers (F) based on silver are layers of silver or of metal alloy containing silver.

The ratio of optical thickness of all the dielectric layers located between the second metallic functional layer (F2) and the absorbent layer (A) to the optical thickness of all the dielectric layers located between the first functional metal layer (F1) and the absorbent layer (A) is preferably between 0.5 and 1.5, preferably 0.7 and 1.3, better still between 0.8 and 1.2, or even 0.9 and 1.1.

In the remainder of the present application, all the energy and aesthetic performance of the coated substrate according to the invention are measured in a configuration:

Outside/4 mm-thick clear glass/stack/PVB (38 mm)/4 mm-thick clear glass/Inside.

Conventionally, the light characteristics are measured using the illuminant D65 at 2° perpendicular to the material, unless indicated otherwise.

In a particular way, the light transmission (TL) of the coated substrate, in the laminated glazing configuration given, is less than 40%, preferably between 30 and 38%.

In a particular way, the solar factor (g) of the coated substrate, in the laminated glazing configuration given, is between 25 and 34%, preferably between 27 and 32%, even more preferably between 29 and 31%.

In a particular way, the selectivity (s) of the coated substrate, in the laminated glazing configuration given, is greater than 1.05, preferably greater than 1.10 and even more preferably greater than 1.13.

In a particular way, the light reflection on the outer side of the glazing ($RL_{ext}$), in the configuration given, is less than 25%, preferably less than 22%, and even more preferably less than 20%.

In a particular way, the colorimetric indices a* and b* of the CIELab measurement system, La*b* measured in reflection on the outer side at normal incidence, are particularly between −12 and 2, preferably between −10 and 1, even more preferably between −7 and 0, in a configuration: 4 mm-thick clear glass/stack/PVB (38 mm)/4 mm-thick clear glass.

When the angle of incidence of the observer is 45°, these same indices a* and b*, measured in reflection on the outer side, are between −12 and 2, preferably between −10 and 1, in a configuration: 4 mm-thick clear glass/stack/PVB (38 mm)/4 mm-thick clear glass.

When the angle of incidence of the observer is 60° relative to the normal, the colorimetric indices a* and b* measured in reflection on the outer side, are between −12 and 3, preferably between −10 and 2, in a configuration: 4 mm-thick clear glass/stack/PVB (38 mm)/4 mm-thick clear glass.

The silver-based metallic functional layers can be "protected" by a layer qualified of blocking layer. A blocking layer located above a silver-based functional metal layer is referred to as blocking overlayer. A blocking layer located below a silver-based functional metal layer is referred to as blocking underlayer.

The functional coating may comprise at least one blocking overlayer, preferably located immediately in contact with the functional metal layer.

The functional coating may comprise one blocking overlayer, preferably located immediately in contact with each functional metal layer.

Preferably, the functional coating does not comprise a blocking underlayer located immediately in contact with the functional metal layer. When the functional coating comprises a blocking layer located below the first functional layer, the thickness of this blocking underlayer is strictly less than 1 nm.

The blocking layers are selected from metal layers based on a metal or on a metal alloy, the metal nitride layers, the metal oxide layers and the metal oxynitride layers of one or more elements selected from titanium, nickel, chromium, tantalum and niobium, such as Ti, TiN, TiOx, Nb, NbN, Ni, NiN, Cr, CrN, NiCr or NiCrN.

When these blocking layers are deposited in the metal, nitride or oxynitride form, these layers can undergo a partial or complete oxidation according to their thickness and the nature of the layers which surround them, for example, during the deposition of the following layer or by oxidation in contact with the underlying layer.

The blocking layers may be selected from metal layers, in particular an alloy of nickel and chromium (NiCr) or titanium.

The coating advantageously comprises a blocking layer deposited on at least one of the two metallic functional layers (F). The stack formed may then be:

Substrate/Di1/F1/M1/Di2a/A/Di2b/F2/M2/Di3.

These blocking layers are generally of the order of 0.3 to 2 nm.

The sum of the thicknesses of all the blocking layers located in contact with the functional layers in the functional coating is less than 4 nm, preferably less than 3.5 nm, or even less than 3 nm.

Advantageously, each dielectric coating comprises a dielectric layer based on silicon and/or aluminum nitride.

In a particular embodiment, the dielectric coatings (Di) comprise a layer of dielectric material based on nitride, based on silicon and/or aluminum nitride (for example $Si_3N_4$) and a layer of dielectric material based on oxide, preferably based on zinc oxide (for example ZnO:Al), the oxide-based layer being on the side of the metallic functional layer.

The dielectric coating located below the first functional layer may comprise:
a dielectric layer based on silicon and/or aluminum nitride,
a dielectric layer based on oxide, preferably based on zinc oxide,
optionally a blocking layer,
the oxide layer is located in contact with the functional layer or in contact with the blocking layer.

The absorbent layer may be separated from each metallic functional layer (F1 and F2) by at least one layer of dielectric material (Di2a, Di2b). The layer of dielectric material may be selected from layers based on silicon and/or aluminum nitride.

The optical thickness of the dielectric coatings is generally between 50 and 100 nm for the first and third coatings, preferably between 65 and 85 nm. The optical thickness of the total intermediate dielectric coating (Di2) is generally between 100 and 300 nm, preferably between 140 and 250 nm, preferably between 160 and 230 nm.

If the dielectric coatings Di1 and Di3 comprise several successive dielectric layers, the thicknesses are calculated for all the dielectric layers forming the dielectric coating together. For the intermediate dielectric coating Di2, it may either be entirely on one side of the absorbent layer or distributed on either side of the absorbent layer. For the given thickness values, all of the layers of dielectric material between the two functional metal layers are taken into account; the thickness of the absorbent layer, on the other hand, is not taken into account for calculating the optical thickness of the dielectric coating.

According to a particular embodiment, it is possible to provide a thin metal blocking layer under at least one of the two functional metal layers. These blocking layers are generally of the order of 0.3 to 2 nm.

The stack may also comprise an upper protective layer. The upper protective layer is preferably the last layer of the stack, that is the layer furthest from the substrate coated with the stack. These upper protective layers are regarded as included in the final dielectric coating (Di3).

These layers generally have a thickness of between 2 and 10 nm, preferably between 2 and 5 nm.

The protective layer can be selected from a layer of titanium, zirconium, hafnium, zinc and/or tin, this or these metals being in the metal, oxide or nitride form. Advantageously, the protective layer is a layer of titanium oxide, a layer of tin zinc oxide or a layer based on titanium zirconium oxide.

The invention further relates to the use of a coated substrate as described above for producing a laminated glazing, comprising at least two substrates which are held together by a plastic interlayer film.

The stack according to the invention is preferably positioned on face 2 of the glazing, i.e. on the internal face of the outer substrate, so as to form a structure of type: glass/stack of thin layers/plastic interlayer film/glass.

Each substrate may be clear or colored. One of the substrates at least especially may be made of bulk-tinted glass. The choice of the type of coloring will depend on the level of light transmission and/or on the colorimetric appearance desired for the glazing once the manufacture thereof is complete.

The plastic interlayer film may especially be based on polyvinyl butyral PVB, ethylene vinyl acetate EVA, polyethylene terephthalate PET or polyvinyl chloride PVC.

The substrates of the glazings according to the invention are capable of undergoing a heat treatment. They are thus optionally bent and/or tempered.

The following nonlimiting examples make it possible to show the advantageous details and features of the invention.

EXAMPLES

Figure 2:
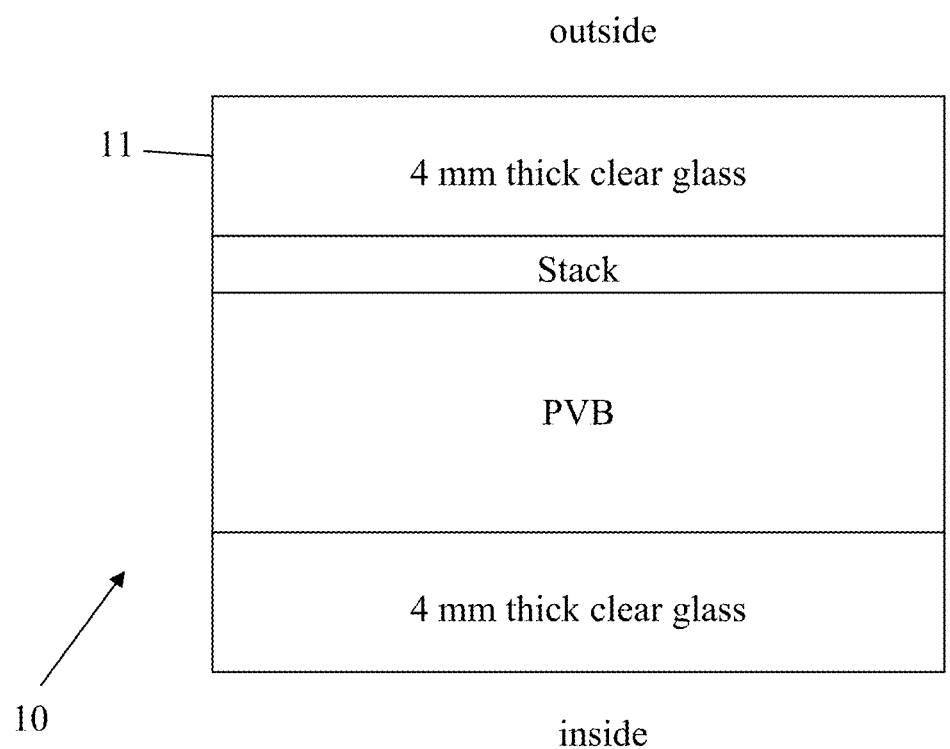

Table 1 below shows the geometric thicknesses in nanometers of each of the layers of the stacks produced for the comparative examples (C1 to C3) and the examples according to the invention (Ex. 1 to 2). FIG. 1 schematically shows the stack of Example 1 that includes an optional blocking layer below the first metallic functional layer F1. FIG. 2 shows a glazing 10 wherein an uncoated face of a first transparent substrate 11 is intended to form an outer side of the glazing 10, a light reflection on the outer side being less than 25% when the light reflection is measured in a configuration: 4 mm-thick clear glass (first transparent substrate)/stack/PVB/4 mm-thick clear glass.

The comparative example C1 is similar to the stacks according to the invention but does not comprise an absorbent layer.

The comparative example C2 is a stack of layers corresponding to that described in example 5bis of patent EP 1341732 B1.

The comparative example C3 is a stack of layers corresponding to that described in example 2 of application WO2018/875005.

TABLE 1

|  |  | C1 | C2 | C3 | Ex. 1 | Ex. 2 |
|---|---|---|---|---|---|---|
| Di3 | $Si_3N_4$ | 38.3 | 20.0 | 39.9 | 31.9 | 36.1 |
|  | AZO | 4.0 | 12.9 | / | 4.0 | 4.0 |
| M2 | NiCr | 0.9 | 1.0 | 0.3 | 1.0 | 1.0 |
| F2 | Ag | 6.4 | 17.5 | 6.4 | 10.3 | 10.6 |
| B2 | NiCr | / | / | 2.0 | / | / |
| Di2b | AZO | 4.0 | 12.9 | / | 4.0 | 4.0 |
|  | $Si_3N_4$ | 75.6 | 30.0 | 51.9 | 49.3 | 41.8 |
| A | TiN | / | 2.0 | / | 14.1 | / |
|  | NbN | / | / | / | / | 5.3 |
|  | NbZrON | / | / | 8.4 | / | / |
| Di2a | $Si_3N_4$ | / | 30.0 | 43.0 | 51.2 | 37.5 |
|  | AZO | 4.0 | 12.9 | / | 4.0 | 4.0 |
| M1 | NiCr | 7.3 | 1.0 | 1.4 | 1.0 | 1.0 |
| F1 | Ag | 11.3 | 6.4 | 13.0 | 10.6 | 10.8 |
| B1 | NiCr | / | / | 1.2 | / | / |
| Di1 | AZO | 4.0 | 12.9 | / | 4.0 | 4.0 |
|  | $Si_3N_4$ | 36.3 | 29.0 | 67.4 | 32.1 | 32.0 |
| substrate | Glass |  |  |  |  |  |

Table 2 below summarizes the main optical and energy characteristics obtained in a configuration:

Outside/4 mm-thick clear glass/stack/PVB (38 mm)/4 mm-thick clear glass/Inside

TABLE 2

|  |  | C1 | C2 | C3 | Ex. 1 | Ex. 2 |
|---|---|---|---|---|---|---|
| F2/F1 |  | 0.57 | 2.73 | 0.49 | 0.97 | 0.98 |
| Di3/Di1 |  | 1.05 | 0.79 | 0.59 | 0.99 | 1.11 |
| TL | % | 37.0 | 44.3 | 47.3 | 33.5 | 35.6 |
| g | % | 29.5 | 34.4 | 24.6 | 28.7 | 31.1 |
| S |  | 1.25 | 1.4 | 1.16 | 1.17 | 1.14 |
| $RL_{ext}$ | % | 29.8 | 15.1 | 27.5 | 20.0 | 17.4 |
| $RL_{int}$ | % | 20 | 25.3 | 8.3 | 18.7 | 12.7 |
| a* T |  | −5.1 | −7.7 | −8.0 | −3.9 | −4.3 |
| b* T |  | −0.8 | −3.6 | +7.8 | −2.8 | −0.8 |
| a* $R_{ext}$ |  | +3.2 | +0.7 | +4.0 | −6.8 | −1.0 |
| b* $R_{ext}$ |  | +1.9 | −9.4 | −12.1 | −0.7 | −5.3 |
| a* $R_{int}$ |  | +0.2 | +7.6 | −0.6 | −6.3 | −0.7 |
| b* $R_{int}$ |  | +2.2 | +10.9 | −26.4 | −3.2 | −4.4 |
| a* $R_{ext\ 45}$ |  | +2.1 | +3.0 | +5.3 | −5.9 | +0.1 |
| b* $R_{ext\ 45}$ |  | +3.5 | −7.8 | −9.3 | −2.7 | −4.8 |
| a* $R_{ext\ 60}$ |  | −3.4 | +4.1 | +5.0 | −4.2 | +0.9 |
| b* $R_{ext\ 60}$ |  | −6.7 | −7.2 | −7.2 | −4.0 | −4.9 |
| $t_{abs.\ effective}$ | nm | 0 | 5.4 | Not determined | 76.8 | 64.4 |

In conclusion, it can be seen that the examples according to the invention make it possible to produce laminated glazings with a light transmission of the order of 35% while combining low solar factors (g of less than 32%) and low light reflection ($RL_{ext}$ of less than 20%) and while providing a desired appearance.

The comparative examples either have a higher TL or a higher $RL_{ext}$, or both.

What is particularly noteworthy is that the color in reflection on the outer side was able to be kept in the neutral zones, which is not the case for the comparative examples.

The angular stability of the outer color in reflection is particularly improved with respect to the stacks of the comparative examples. Example 2, most particularly, shows a difference of less than 1 between the value of the coefficient b* at the normal (−5.3) and the value at 45° (−4.8) or 60° with respect to the normal (−4.9).

The present invention is described in the preceding text by way of example. Of course, those skilled in the art are capable of implementing different variants of the invention without departing from the scope of the patent such as defined by the claims.

The invention claimed is:

1. A laminated glazing comprising two transparent substrates, between which an adhesive interlayer is inserted, wherein a first transparent substrate of the two transparent substrates is coated on one face with a stack of thin layers forming a functional coating which is adapted to act on solar radiation and/or infrared radiation, said functional coating comprising two metallic functional layers, each arranged between two dielectric coatings, so as to comprise, starting from the first transparent substrate, a following sequence of layers and coatings:
   first dielectric coating Di1/first metallic functional layer F1/second dielectric coating Di2/second metallic functional layer F2/third dielectric coating Di3,
   each of the first dielectric coating Di1, second dielectric coating Di2 and third dielectric coating Di3 comprising at least one layer of dielectric material,
   wherein:
   the second dielectric coating Di2 located between the first and second metallic functional layers F1, F2 comprises at least one absorbent layer which absorbs solar radiation in the visible part of the spectrum,
   the at least one absorbent layer is surrounded, and in contact, on one side or on both sides, with a layer of dielectric material,
   a ratio of optical thickness of all dielectric layers located between the second metallic functional layer F2 and the at least one absorbent layer to an optical thickness of all dielectric layers located between the first functional metal layer F1 and the at least one absorbent layer is between 0.5 and 1.5,
   the first and second metallic functional layers F1, F2 have a ratio of thickness of the second metallic functional layer F2 to the first metallic functional layer F1 of between 0.7 and 1.5;
   the first and third dielectric coatings Di1, Di3 have a ratio of optical thickness of the third dielectric coating Di3 to the first dielectric coating Di1 of between 0.7 and 1.5,
   the optical thickness of each of the first dielectric coating Di1 and the third dielectric coating Di3 is between 50 and 100 nm,
   each of the second dielectric coating Di2 and third dielectric coating Di3 comprises a dielectric layer based on silicon nitride,
   the first dielectric coating Di1 comprises a first dielectric layer based on silicon nitride and a second dielectric layer based on an oxide arranged between the first dielectric layer based on silicon nitride and the first metallic functional layer,
   a light transmission (TL) of the laminated glazing is less than 40% when it is measured with the two transparent substrates that are each 4 mm-thick clear glass and the adhesive interlayer comprises polyvinyl butyral (PVB) and is in a configuration: 4 mm-thick clear glass/stack/PVB/4 mm-thick clear glass, and
   the at least one absorbent layer is based on:
   metal,
   nitride selected from the list comprising NbN, TiN, ZrN, TiZrN, or
   oxynitride selected from the list comprising TiNO, NbNO,
   or mixtures thereof.

2. The laminated glazing according to claim 1, wherein, in the case when the functional coating comprises a blocking underlayer located between the first metallic functional layer F1 and the first transparent substrate, a thickness of said blocking underlayer is strictly less than 1 nm.

3. The laminated glazing according to claim 1, wherein the functional coating comprises a metal blocking layer deposited on a side furthest from the first substrate of at least one of the first and second metallic functional layers.

4. The laminated glazing according to claim 1, further comprising a first blocking layer and optionally a third blocking layer in contact with the first metallic functional layer F1 and a second blocking layer and optionally a fourth blocking layer in contact with the second metallic functional layer F2 and wherein a sum of thicknesses of all blocking layers located in contact with the first and second functional layers F1, F2 in the functional coating is less than 4 nm.

5. The laminated glazing according to claim 1, wherein each of the first dielectric coating Di1, second dielectric coating Di2 and third dielectric coating Di3 comprises a dielectric layer based on zinc oxide.

6. The laminated glazing according to claim 1, wherein the first dielectric coating Di1 located between the first metallic functional layer F1 and the first transparent substrate comprises:
   the first dielectric layer based on silicon nitride,
   the second dielectric layer based on oxide,
   a blocking layer,
   the second dielectric layer based on an oxide is located in contact with the blocking layer.

7. The laminated glazing according to claim 1, wherein the absorbent layer is separated from each of the first and the second metallic functional layer F1, F2 by at least one layer of dielectric material selected from layers based on silicon nitride and/or zinc oxide.

8. The laminated glazing according to claim 1, wherein the absorbent layer is selected from layers based on one of the following materials: Ti, NiCr, Nb, Zr, NiCuCr, NbN, TIN, ZrN, TiZrN or TiNO, NbNO, or mixtures thereof.

9. The laminated glazing according to claim 1, having a selectivity of greater than 1.05% when the selectivity is measured in a configuration: 4 mm-thick clear glass/stack/PVB/4 mm-thick clear glass.

10. The laminated glazing according to claim 1, wherein an uncoated face of the first transparent substrate is intended to form an outer side of a glazing, a light reflection on the outer side being less than 25% when the light reflection is measured in a configuration: 4 mm-thick clear glass/stack/PVB/4 mm-thick clear glass.

11. The laminated glazing according to claim 1, wherein each of the second and third dielectric coatings Di2, Di3 comprises at least one layer of nitride-based dielectric material and at least one layer of oxide-based dielectric material.

12. The laminated glazing according to claim 1, wherein the first transparent substrate is arranged on an outer side of the glazing.

13. The laminated glazing according to claim 4, wherein the sum of thicknesses of all blocking layers located in contact with the first and second metallic functional layers F1, F2 in the functional coating is less than 3.5 nm.

14. The laminated glazing according to claim 13, wherein the sum of thicknesses of all blocking layers located in contact with the first and second metallic functional layers in the functional coating is less than 3 nm.

15. The laminated glazing according to claim 6, wherein the second dielectric layer based on oxide is zinc oxide.

* * * * *